May 13, 1947.                D. E. DASHER                2,420,359
                          METHOD OF MAKING DIES
                   Filed May 22, 1944          3 Sheets-Sheet 1
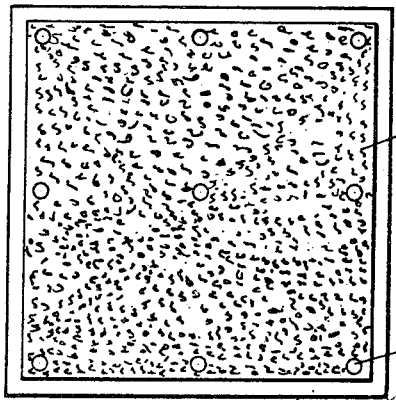
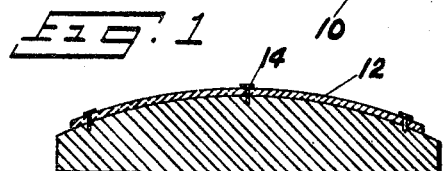
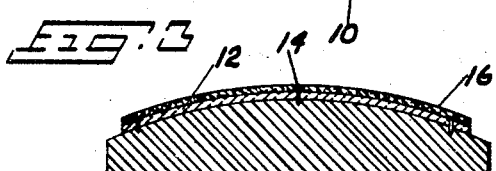
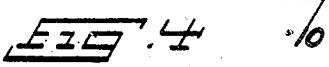
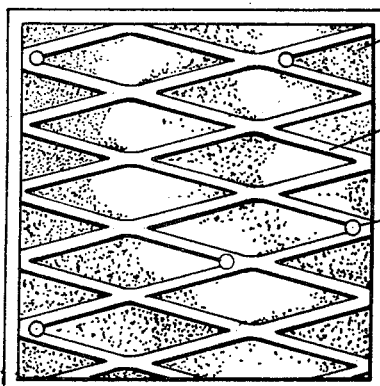
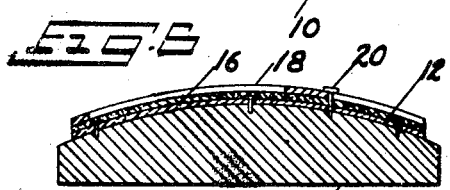
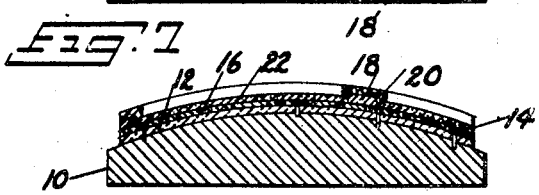
INVENTOR.
DON E. DASHER
BY
*O. H. Fowler*
ATTORNEY May 13, 1947.  D. E. DASHER  2,420,359
METHOD OF MAKING DIES
Filed May 22, 1944  3 Sheets-Sheet 2
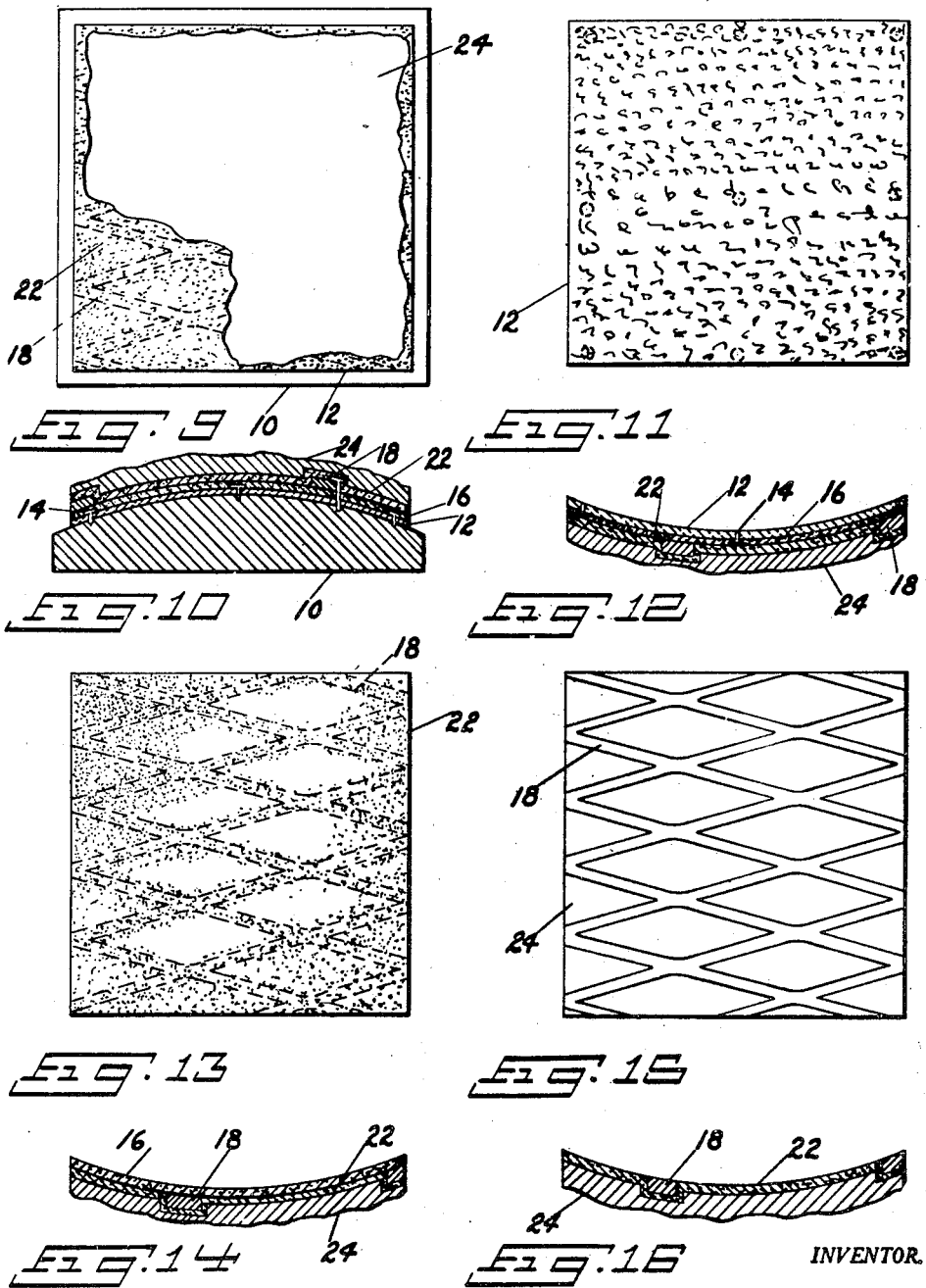
INVENTOR.
BY DON E. DASHER
ATTORNEY May 13, 1947.   D. E. DASHER   2,420,359
METHOD OF MAKING DIES
Filed May 22, 1944   3 Sheets-Sheet 3

INVENTOR.
DON E. DASHER
BY
ATTORNEY

Patented May 13, 1947

2,420,359

UNITED STATES PATENT OFFICE 2,420,359

METHOD OF MAKING DIES

Don E. Dasher, Detroit, Mich., assignor to Bendix Aviation Corporation, Detroit, Mich., a corporation of Delaware Application May 22, 1944, Serial No. 536,853

6 Claims. (Cl. 76—107)

This invention relates to dies, and more particularly to a method for the manufacture thereof.

Broadly the invention comprehends the production of a die for casting or moulding irregular bodies. The invention aims to provide a composite die structure which may be easily and quickly assembled on a template of any desired contour.

An object of the invention is to provide a composite die of simple structure.

Another object of the invention is to provide a composite die having great strength and rigidity.

Another object of the invention is to provide a simple and efficient method for the production of dies.

A further object of the invention is to provide a simple method for the production of dies having a marked degree of accuracy.

Other objects and advantages of the invention will appear from the following description taken in connection with the accompanying drawings forming a part of this specification and in which, Fig. 1 is a top plan view of a template having secured thereto a sheet of asbestos paper;

Fig. 2 is a sectional view of Fig. 1;

Fig. 3 is a top plan view illustrating the asbestos sheet coated with copper;

Fig. 4 is a cross-sectional view of Fig. 3;

Fig. 5 is a top plan view illustrating a sheet of expanded and rolled metal secured on top of the copper-coated asbestos;

Fig. 6 is a cross-sectional view of Fig. 5;

Fig. 7 is a top plan view of copper coating on the expanded metal sheet;

Fig. 8 is a cross-sectional view of Fig. 7;

Fig. 9 is a top plan view illustrating a backing plate moulded on the copper coated expanded metal;

Fig. 10 is a cross-sectional view of Fig. 9;

Fig. 11 is a plan view illustrating the die removed from the template and reversed;

Fig. 12 is a cross-sectional view of Fig. 11;

Fig. 13 is a plan view illustrating the face of the die with the asbestos sheet removed from the template;

Fig. 14 is a cross-sectional view of Fig. 13;

Fig. 15 is a plan view of the finished face of the die;

Fig. 16 is a cross-sectional view of Fig. 15;

Figure 17:
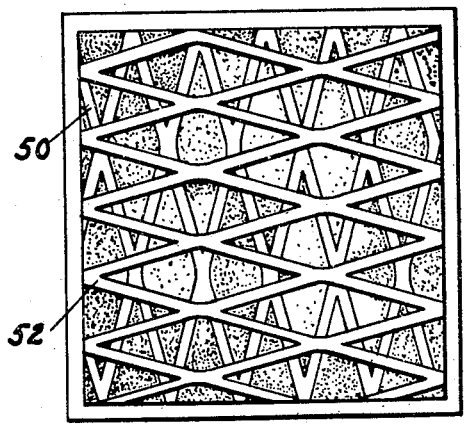
Fig. 17 is a top plan view illustrating a modification of the invention.

Referring to the drawings for more specific details of the invention, 10 represents a template for a die which may be of any desired contour. A sheet of asbestos or other suitable non-combustible, non-conducting, and chemically-resisting material 12 is laid smoothly on the template and suitably secured thereto as by tacks 14. The asbestos sheet 12 is then sprayed with molten copper to provide a thin copper coating 16.

A sheet of expanded and rolled metal 18 is suitably cleaned and dipped in a bath of molten metals, preferably an alloy consisting of lead, tin and antimony in suitable proportions, or any other desirable bonding agent may be used. The sheet of metal so treated is spread on the copper coating 16, deformed to take the contour thereof, and secured against displacement as by tacks 20. Another coat of copper 22 is then sprayed on the assembly, or, if preferred, molten zinc may be sprayed on in lieu of the copper coating. Either of these materials provides a highly desirable bonding agent, yet another bonding agent may be used with good results.

Molten zinc is then applied to the assembly to provide a backing plate 24 of substantial and approximately uniform thickness. It is, of course, to be understood that other suitable metals, having a melting point below that of the expanded metal sheet 18, may be employed for this purpose. The backing plate completely fills the mesh or openings of the expanded metal and is effectively bonded to the expanded metal by the copper coating 22. When the backing plate completely solidifies and becomes sufficiently cool for handling without discomfort, the assembly is removed from the template 10 and reversed. The asbestos sheet 12 is then stripped from the assembly or face of the die, the tacks 20 are clipped, and the copper coating 16 is ground sufficiently to expose the expanded metal 18. This is an important factor in that the expanded metal 18 provides a guide for the grinding operation, to the end that the face of the die may be complementary to the template 10. Upon completion of the grinding operation, the face is finished by any suitable polishing operation.

Figure 18:
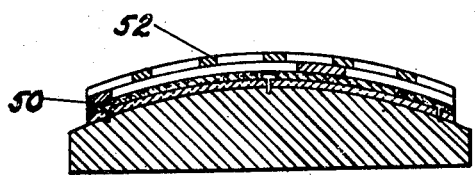
Fig. 18 is a cross-sectional view of Fig. 17.

A modification of the invention is illustrated in Figs. 17 and 18. In this embodiment both the structure and mode of fabrication of the die are identical to that of the preferred embodiment with the exception that two sheets of expanded and rolled metal 50 and 52 are arranged transversely of one another in order to give additional strength and rigidity to the die.

While this invention has been described in connection with certain specific embodiments, the principle involved is susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A method for the production of dies comprising shaping a sheet of expanded and rolled metal to the surface contour of a template, treating the expanded metal with a bonding agent, embedding the expanded metal in a metallic plate, and grinding the plate until the expanded metal is exposed.

2. A method for the production of dies comprising shaping a sheet of expanded and rolled metal to the surface contour of a template, coating the sheet with copper, embedding the coated sheet in a metallic plate, and grinding the plate until the sheet is exposed.

3. A method for the production of dies comprising covering a template with asbestos, securing a sheet of expanded and rolled metal on the asbestos, coating the sheet with a bonding agent, pouring molten metal over the sheet to provide a backing plate, removing the assembly from the template, removing the asbestos, and grinding the plate until the expanded metal is exposed.

4. A method for the production of dies comprising covering a template with a sheet of asbestos, spraying the sheet with molten metal, deforming expanded and rolled metal to the covered template, applying a bonding agent to the expanded metal, embedding the expanded metal in a metallic backing plate, removing the assembly from the template, removing the asbestos, and grinding the plate until the expanded metal is exposed.

5. A method for the production of dies comprising covering a template with a sheet of asbestos, spraying the asbestos with copper, spreading a sheet of expanded and rolled metal on the asbestos, deforming the expanded metal to the covered template, securing the expanded metal to the template, treating the expanded metal with a bonding agent, embedding the expanded metal in a metallic backing plate, removing the assembly from the template, removing the asbestos, and grinding away the copper until the expanded metal is exposed.

6. A method for the production of dies comprising covering a template with a sheet of asbestos, spraying the asbestos with copper, deforming and securing a sheet of expanded and rolled metal to the covered template, spraying the expanded metal with copper, embedding the expanded metal in a metallic backing plate, removing the assembly, removing the asbestos, grinding the face until the expanded metal is exposed, and polishing the face.

DON E. DASHER.

REFERENCES CITED

The following references are of record in the file of this patent:

UNITED STATES PATENTS

| Number | Name | Date |
|---|---|---|
| 1,868,788 | Zinser | July 26, 1932 |
| 1,958,072 | Sebrell | May 8, 1934 |
| 1,947,916 | Mitchell | Feb. 20, 1934 |
| 1,380,919 | Maier | June 7, 1921 |
| 1,691,756 | Campbell | Nov. 13, 1928 |
| 673,822 | Sagendorph | May 7, 1901 |
| 1,747,311 | Meyercord et al. | Feb. 18, 1930 |
| 1,866,790 | Bateman | July 12, 1932 |
| 1,912,889 | Couse | June 6, 1933 |
| 1,950,604 | Fitz Gerald | Mar. 13, 1934 |